United States Patent Office 2,836,062
Patented May 27, 1958

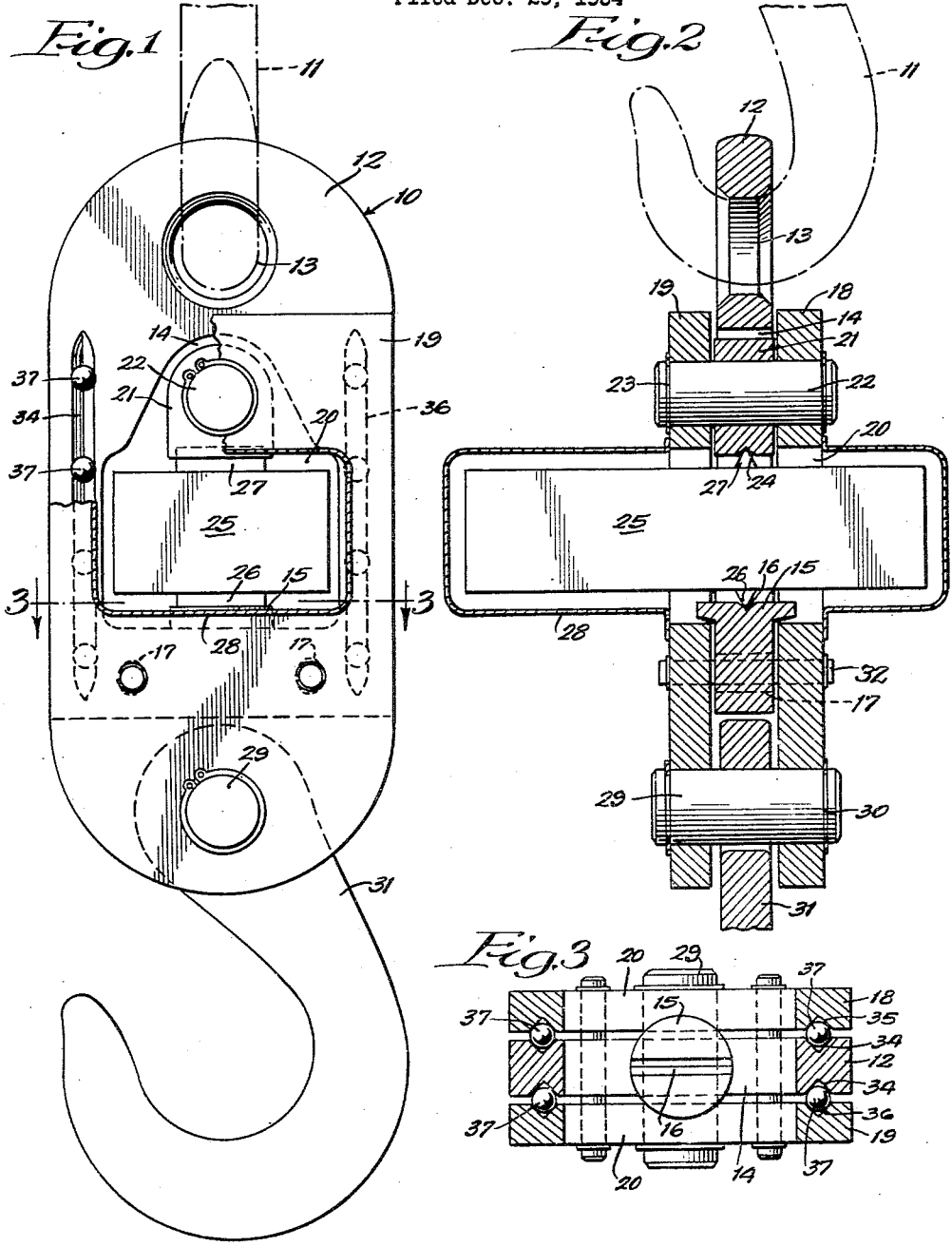
May 27, 1958     T. A. WELLS     2,836,062
TENSION WEIGHING SYSTEM
Filed Dec. 29, 1954
INVENTOR:
Theodore A. Wells,
BY
Davern, Litton & Graham,
ATTORNEYS.

2,836,062
TENSION WEIGHING SYSTEM

Theodore A. Wells, Wichita, Kans., assignor to Central Engineering Corporation, Wichita, Kans., a corporation of Kansas Application December 29, 1954, Serial No. 478,341

8 Claims. (Cl. 73—141)

This invention relates to a weighing system, and especially to such a system wherein a force applied in tension is exerted in compression on a weighing device that is operative to measure the magnitude of the applied force.

Frequently, and particularly in industrial applications, it is desirable to ascertain the magnitude of a load without transferring the load onto a weigh scale. For example, cranes and similar apparatus are used to move loads from place to place, and the weighing of loads during such handling operations and as a part thereof would be advantageous. However, heretofore no good and accurate means for measuring the magnitude of loads in tension—that is, while being suspended from a crane—has been known.

It is, accordingly, an object of this invention to provide convenient means for accurately measuring the magnitude of loads and other forces in tension. Another object of the invention is to provide a weighing system in which loads that exert forces in tension can be measured through application of the forces as compressive loads on a weighing device. Still another object is to provide a weighing system in which a hanger member, having a platform, and a carrier member, having a load transfer member, are adapted to have a force in tension applied thereacross—the platform and load transfer members being spaced apart and the hanger and carrier members being movable relative to each other so as to apply a compressive force to a weighing device interposed between the platform and load transfer members.

A further object is in the provision of a weighing system as described in which the hanger member and carrier member, while being movable relative to each other along the longitudinal axes thereof, are provided with means (such as ball and groove type anti-friction arrangements) that are operative to prevent twisting movement of these members relative to each other and in the planes thereof, while permitting substantially free or frictionless movement along the longitudinal axes. Yet a further object is to equip the carrier member with a load transfer device that is freely pivotal relative thereto so that loads applied therethrough to a weighing device will always be normal to the weighing device. Additional objects and advantages will appear as the specification proceeds.

An embodiment of the invention is illustrated in the accompanying drawings, in which—

Figure 1 is a side view in elevation, with parts thereof shown in section, of a weighing device embodying the invention; Figure 2 is a longitudinal sectional view taken along the vertical axis of the device shown in Figure 1; and Figure 3 is a transverse sectional view taken on the line 3—3 of Figure 1.

The weighing system is designated generally with the numeral 10, and is adapted to be interposed in a force system wherein at least certain of the forces act in tension. The device is adapted to measure the magnitude of forces that act in tension. For example, the device may be incorporated in the load carrying system of a crane or some other such structure in which loads are suspended therefrom. As is shown in Figures 1 and 2, the device 10 may be mounted upon the hook 11 that is provided at the end of the hoist cable of the crane.

The device 10 comprises a hanger plate 12 having an opening 13 therethrough adapted to receive the hook 11, as shown in Figures 1 and 2. The hanger 12 has an enlarged opening 14 centrally thereof, as can be seen best in Figure 2. Adjacent the bottom end portion of the hanger 12, and facing upwardly at the bottom of the opening 14, is a platform member 15 having a V-shaped groove 16 therein extending in the plane of the hanger plate. The lower end portion of the hanger plate 12 is also provided with a pair of spaced-apart, enlarged apertures 17 therethrough.

The device also includes a carrier comprising a pair of plates 18 and 19 that are spaced apart and that substantially enclose and receive therebetween the hanger plate 12. Each of the carriers 18 and 19 is provided with a central opening 20 therethrough that is generally in alignment with the opening 14 that extends transversely through the hanger 12. Adjacent the upper ends thereof, the carriers are equipped with a load transfer member 21 that is preferably pivotal along the plane of the members 18 and 19. This pivotal mounting may be accomplished by extending a pin 22 transversely through the carriers 18 and 19, and by pivotally mounting the load transfer member 21 thereon. The pin 22 may be held in place by any suitable means, such as by the lock washers or clamp collars 23 illustrated in Figures 1 and 2. The transfer member 21 is provided with a generally V-shaped groove 24 extending transversely thereof and in alignment with the groove 16 in the platform member 15. The platform member 15 and load transfer member 21 are spaced apart in vertical alignment, and are adapted to have interposed therebetween a weighing device 25 that may be equipped with a pair of loading members 26 and 27 that are generally V-shaped and that are adapted to be received respectively within the V-shaped grooves 16 and 24.

The weighing device 25 may be any suitable unit adapted to have a load registered thereon by compression, or specifically, by application of a compressive force across the loading points 26 and 27. Preferably, the weighing device 25 is one that is electrical in character and that can accurately measure the magnitude of an applied force, while limiting the over-all movement of the points 26 and 27 to a few thousandths of an inch. Desirably, the weighing device 25 is enclosed in a sealed shield or container 28 that is operative to protect the device from moisture etc. in the air.

Adjacent the lower end of the carriers 18 and 19 is a pin 29 that extends therethrough and that may be locked in position, as shown in Figures 1 and 2, by clamp collars 30. The pin 29 is adapted to carry a hook 31 that is provided with an eye therethrough that receives the pin 29 therein. Where the system is used in conjunction with the hoist cable of a crane, the load that is to be measured will be carried by the hook 31.

The carrier plates 18 and 19 are held together by pins 32 that extend therethrough and that are held in place by lock washers 33. The pins 32 extend through the enlarged openings 17 in the hanger member 12 and, as can be seen best in Figure 2, the opening 17 is sufficiently large so that considerable vertical movement between the hanger 12 and carriers 18 and 19 is permitted without interference from the anchor pins 32.

In any system or device in which a force in tension is exerted while applying that force as a compression on another device, there is a tendency for the members having the force in tension applied thereto to overturn or to pivot relative to each other. Thus, in the device shown, when a load is applied in tension between the hooks 11 and 31, there is a tendency for the hanger 12 and carrier plates 18 and 19 to pivot relative to each other along the plane of these members. To be usable, the device must provide means for overcoming this pivotal tendency while at the same time not interfering with substantially free or frictionless movement of these members relative to each other along the longitudinal axes thereof. I prefer to accomplish this result by equiping the facing surfaces of the hanger 12 and the respective carriers 18 and 19 with longitudinally extending grooves designated with the numeral 34 on one side of the hanger 12, 35 in the facing surface of the carrier 18, and 36 in the carrier 19. The grooves are in facing vertical alignment, and positioned within these grooves are a plurality of balls or roller bearings 37. It will be apparent from an inspection of Figure 3 that the balls and grooves are operative to prevent pivotal movement of the hanger 12 relative to the carriers, but do not restrict vertical movement of the hanger relative to the carriers.

Weighing devices such as the device designated generally in Figures 1 and 2, provide greater accuracy in their response when loads are applied thereto along lines that are normal to the weighing device. The load transfer member 21 in being pivotally mounted upon the pin 22 serves as a rocker plate or rocker member that centers the loads applied therethrough to the device 25 so that those loads act along a line that is normal to the device 25. The grooves 16 and 24 which are V-shaped and have side walls that diverge at a slightly greater angle than the walls of the loading members 26 and 27, permit the device 25 to pivot transversely relative to the platform 15 and load transfer member 21 so that any eccentricity in the loading in those directions can be accommodated by the device 25, with the result that those loads also act in directions normal to the device.

Operation

In use of the weighing system, the eye or opening 13 in the hanger 12 may be threaded onto a hook 11, or the hanger 12 may be secured in some other manner to a cable or member having a load in tension applied thereto. The load to be weighed is carried by the hook 31, either directly or indirectly, and it is seen from Figure 2 that the load applied to the hook 31 is transferred through the pin 29 and to the carriers 18 and 19. From the carriers 18 and 19, the load is transferred through the pin 22 and to the rocker plate or load transfer member 21, wherein it is applied as a downward force or load upon the loading point 27 of the weighing device 25. The portion of the load carried by the hook 11 is transferred to the hanger plate 12, and is applied through its platform 15 as an upward force against the loading point 26 of the weighing device 25 that provides the same. Thus, it is apparent that while the forces in tension are acting in opposite longitudinal directions on the hook members 11 and 31, these forces appear as a compressive load across the weighing device 25. As has been brought out hereinbefore, the device 25 is operative to measure the magnitude of this compressive force and, therefore, the magnitude of the forces in tension which provide the same. The carriers 18 and 19 are free to move vertically or along the longitudinal axis thereof relative to the hanger 12 within the limits defined by the pins 32 and the enlarged recesses 17 through which they extend. The channels 34 and 35, and 34 and 36, and the balls 37 interposed therebetween permit such substantially free vertical movement of these members, while being effective to restrain any pivotal or overturning tendency therebetween. Thus, the carrier and hanger members move relative to each other along a true longitudinal axis, and all of the force applied between the hooks 11 and 31 is transferred therethrough and to the weighing device 25. Therefore, mechanical hysteresis is substantially eliminated and exceptionally accurate weight indications obtained.

While in the foregoing specification an embodiment of the invention has been set forth in considerable detail for purposes of illustration, it will be apparent to those skilled in the art that numerous changes may be made in those details without departing from the spirit and principles of the invention.

I claim:

1. In a weighing system of the character described, a hanger equipped with an upwardly oriented platform, a carrier positioned in facing parallel relation therewith and being equipped with a load transfer member, said platform and load transfer member being spaced apart in substantially vertical alignment and being adapted to receive a weighing device therebetween, said hanger and carrier being vertically movable relative to each other whereby a load in tension applied therebetween results in a compressive load being applied to a weighing device interposed between said platform and transfer member, there being elongated channels in the hanger and carrier of greater length than the distance between said platform and load transfer member and defining bearing races in the hanger and carrier, and bearings within those races to constrain relative pivotal movement between the hanger and carrier while affording free vertical movement therebetween.

2. In a weighing system of the character described, a hanger plate adapted to have a load applied thereto adjacent the upper end thereof, said hanger being vertically disposed and having an upwardly facing platform adjacent the bottom end thereof, a pair of carrier plates, one on each side of said hanger plate, and being adapted to have a load applied thereto adjacent the bottom end thereof, said carrier plates being equipped with a load transfer member adjacent the upper end thereof, said load transfer member and said platform being spaced apart in generally vertical alignment and being adapted to have a weighing device interposed therebetween, and means interposed between said hanger and the respective carrier plates and extending longitudinally thereof to constrain pivotal movement therebetween while permitting substantially free vertical movement of the hanger plate relative to said carrier plates.

3. The structure of claim 2 in which said last-mentioned means comprises anti-friction bearings interposed between the hanger plate and carrier plates, and in which all of said plates are provided with complementary races extending beyond the platform and load transfer member and receiving said anti-friction bearings therein.

4. In a weighing device for translating tension loads into compression forces and for measuring the magnitude of those forces, a hanger plate and a pair of carrier plates oriented in generally parallel facing relation with the hanger plate interposed between the carrier plates and in overlapping relation with respect thereto, all of said plates being provided with aligned openings extending transversely therethrough, the opening in said hanger plate being enlarged toward the upper end thereof, said hanger plate providing an upwardly facing platform, and a load transfer member supported by said carrier plates for pivotal movement about an axis normal to the faces thereof and being positioned therebetween within the enlarged upper end of the opening in said hanger plate, said load transfer member being spaced above said platform and in vertical alignment therewith, said hanger plate and said carrier plates being adapted to have tension forces applied thereto whereby said load transfer member and platform tend to move toward each other with the result that a load sensing device interposed therebetween has a compressive force applied thereacross.

5. The device of claim 4 in which said load transfer member is pivotally carried by a pin secured to said carrier plates and having its longitudinal axis normal to the faces thereof.

6. The structure of claim 5 in which said hanger plate and each of said carrier plates are provided with facing channels extending longitudinally thereof and terminating at points above and below, respectively, the load transfer member and platform, the facing channels defining races, and bearings positioned within those races.

7. The structure of claim 6 in which the facing surfaces of said platform and load transfer member are provided with generally V-shaped grooves therein extending in vertical alignment in a plane parallel to the faces of said plates, and in which a load sensitive member equipped with corresponding generally V-shaped bearing members is mounted between the load transfer member and platform with the V-shaped bearing members thereof within said V-shaped grooves.

8. In a weighing system of the character described wherein forces in tension are measured as a compressive force applied against a weighing device, a hanger equipped adjacent the bottom thereof with an upwardly oriented platform and being adapted to have an upwardly oriented force applied thereto, a pair of carriers oriented in facing relation with said hanger and equipped adjacent the upper ends thereof with a load transfer member and being adapted to have a downwardly oriented force applied thereto, said platform and transfer member being spaced apart in substantially vertical alignment and being adapted to receive a weighing device therebetween, said load transfer member being pivotal relative to said carriers about an axis substantially normal thereto, said hanger and carriers being vertically movable relative to each other whereby a load in tension applied thereto results in a compressive load being applied to such weighing device received between said platform and load transfer member, and means for constraining pivotal movement of the hanger relative to said carriers while permitting substantially free vertical movement therebetween, said load transfer member and platform being equipped with transversely extending grooves in spaced apart vertical alignment, said grooves being adapted to receive the load transfer members of such a weighing device.

References Cited in the file of this patent

UNITED STATES PATENTS

| | | |
|---|---|---|
| 1,214,745 | Beard | Feb. 6, 1917 |
| 2,414,161 | Moore | Jan. 14, 1947 |
| 2,590,626 | Jones | Mar. 25, 1952 |
| 2,616,683 | Le Fevre | Nov. 4, 1952 |